Oct. 30, 1962            B. E. BURGERT           3,061,597
VINYL CYANIDE/N-VINYL-3-MORPHOLINONE COPOLYMERS
Filed March 3, 1960
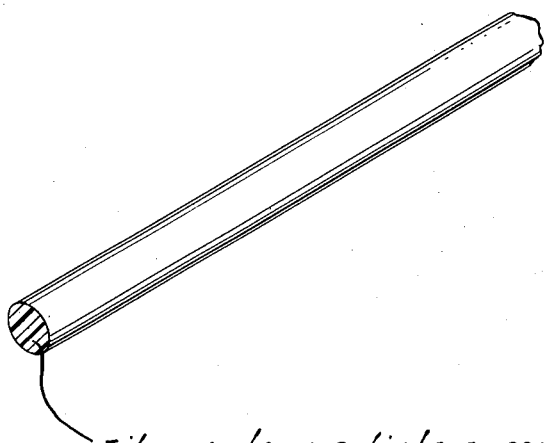
Filamentous article comprised of a fiber-forming copolymer of vinyl cyanide and N-vinyl-3-morpholinone.
INVENTOR.
Billy E. Burgert
BY
ATTORNEY 3,061,597
VINYL CYANIDE/N-VINYL-3-MORPHOLINONE COPOLYMERS
Billy E. Burgert, Midland, Mich., assignor to The Dow Chemical Company, Midland, Mich., a corporation of Delaware
Filed Mar. 3, 1960, Ser. No. 12,569
5 Claims. (Cl. 260—85.5)

The present invention contributes to the organic polymer art and, in particular, relates to fiber-forming copolymers of vinyl cyanide (i.e., acrylonitrile) and N-vinyl-3-morpholinone monomers. Fibers prepared from the copolymers of the present invention are readily dyeable and have physical properties commensurate with those of fibers from vinyl cyanide homopolymer (i.e., polyacrylonitrile).

The present application is a continuation-in-part of copending application for United States Letters Patent having Serial No. 692,587 for "N-Vinyl-3-Morpholinone Compounds," filed October 28, 1957 (now U.S. Patent No. 2,987,509).

The inherent properties of polyacrylonitrile have made it especially suited for fibers. The main exception to this lies in the generally poor dyeability of polyacrylonitrile fibers.

Several methods of enhancing the dyeability of polyacrylonitrile have been proposed. These include formation of various random copolymers; graft copolymers, and physical blends of polyacrylonitrile with other dye-assisting adjuvants, particularly polymeric constituents. Invariably some of the desirable fiber-forming properties of the acrylonitrile polymer are lost when such modifications are resorted to. Decreases in such properties as sticking temperature and tensile strength are often encountered when copolymers, including graft copolymers, and polymer blends are employed. In addition, even when the known procedures for increasing the dye-receptivity of acrylonitrile polymers do not drastically impair physical properties, the resulting product may not always have the advantageous characteristic of being readily through-dyeable (i.e., colorable with conventional dyestuffs according to normal procedures in other than peripheral regions of the fiber product).

The chief aim and design of the present invention is to provide new fiber-forming acrylonitrile copolymers that, when fabricated in filamentary form, provide fiber products that are readily and thru dyed and which exhibit physical properties comparable to fibers of polyacrylonitrile spun under similar or equivalent conditions.

Additional objectives and many cognate advantages will be apparent throughout the description and specification which follows.

The fiber-forming copolymers of the present invention, as indicated, are copolymers of vinyl cyanide and an N-vinyl-3-morpholinone monomer of the type hereinafter more fully delineated which contain between about 80 and about 99 weight percent, preferably between about 85 and about 95 weight percent, of polymerized vinyl cyanide in the polymer molecule.

While it is ordinarily desirable for the copolymers of the present invention to be two-component compositions (i.e., products of the polymerization of vinyl cyanide and the N-vinyl-3-morpholinone monomer) it is possible to use additional monomeric materials in their preparation, particularly when the polymerized copolymer product contains at least about 80 weight percent of polymerized vinyl cyanide and at least about 1 weight percent of the polymerized N-vinyl-3-morpholinone. Thus, other monomeric materials which may be employed are any one or more of the many other monomeric substances well known to the art capable of being copolymerized with vinyl cyanide to form fiber-forming polymer products. These include such materials as allyl alcohols, vinyl acetate, vinyl propionate, vinyl butyrate, methacrylamide, methyl acrylate, ethyl acrylate, 2-vinyl pyridine, dimethyl aminoethyl acrylate, methacrylonitrile, acrylic acid, butadiene, itaconic and fumaric acids, vinyl acetic acid, fumaronitrile, 2-vinyl-5-ethyl-pyridine, ethylene sulfonic acid and its alkali metal salts, allyl sulfonic acids and its alkali metal salts, styrene sulfonic acid and its alkali metal salts, sulfonated vinyl toluene and other sulfonated vinyl aryl monomers and the like.

The N-vinyl-3-morpholinone monomers that are copolymerized with vinyl cyanide in the practice of the present invention are of the structure:

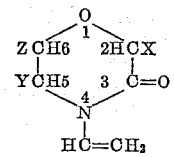

in which each of the X, Y and Z substituents can independently be either hydrogen or alkyl (including haloalkyl) substituents containing from 1 to about 4 carbon atoms. Advantageously, non-ring-substituted N-vinyl-3-morpholinone is employed wherein, according to the foregoing structure, X, Y and Z are all hydrogen. If desired, however, ring-substituted monomers may be employed such as N-vinyl-5-methyl-3-morpholinone; N-vinyl-5-ethyl-3-morpholinone; N-vinyl-5-butyl-3-morpholinone; and equivalent 2- or 6-substituted derivatives as well as like derivatives with plural (i.e., up to three) ring substituted alkyl groups; and analoguous derivatives with one or more haloalkyl (such as chloromethyl, bromoethyl, etc.) substituent groups.

The copolymers of the present invention may be prepared by any desired method of polymerization, including polymerization in mass (which is oftentimes referred to as bulk polymerization), as well as polymerization in aqueous or other solution or in emulsion or other dispersion in liquids with which they are not soluble or miscible. The polymerization may be accomplished at any desired concentration of monomer varying from extremely dilute conditions to very great concentrations in polymerization masses which consist substantially entirely of the monomers being polymerized.

It is ordinarily beneficial for the polymerization to be conducted at a temperature that is, say, between about 50 and 100° C., depending somewhat on the particular polymerization technique and the form of catalysis or polymerizing inducement being employed. Suitable catalysts or initiators for polymerization include the azo catalysts, such as azo-bis-isobutyronitrile, peroxygen catalysts, such as potassium per sulfate, and irradiation under the influence of high energy fields.

In many instances, it is particularly advantageous to directly polymerize the comonomers in a solvent useful for containing the copolymer product in the desired resulting spinning solution. Such solvents as ethylene carbonate, dimethyl sulfoxide, dimethyl formamide and so forth using techniques in particular instances well known to those skilled in the art may be utilized with great advantage for this purpose.

Along this line, the copolymers of the present invention may be directly polymerized with great advantage in any of the aqueous saline solutions that are solvents for vinyl cyanide and polyacrylonitrile. These, as is well known in the art, include aqueous solutions of zinc chloride; as well as aqueous solutions of such inorganic salts as the thiocyanates of aluminum; calcium and antimony; the bromides of lithium and tin; the chlorides of nickel and manganese; mixtures thereof, and so forth.

The possibility of direct preparation of an acrylonitrile copolymer having a polymerized N-vinyl heterocyclic therein is particularly advantageous and surprising in view of the fact that many of the N-vinyl heterocyclic monomers of interest (such as N-vinyl-2-pyrrolidone) cannot be readily or in a straightforward manner polymerized in such media due to difficulties caused by decomposition of the N-heterocyclic monomer in the saline solution.

Of course, if the copolymers are separately prepared, good spinning solutions thereof for any desired variety of fiber spinning operation can be prepared using organic or inorganic solvents adapted for the intended purpose, as will be readily apparent to those skilled in the art. The copolymers may be spun into fibers and the like according to procedures and techniques which are commonly practiced with fiber-forming acrylonitrile compositions.

Fiber products from copolymers in accordance with the present invention (one of which is schematically illustrated in the sole figure of the accompanying drawing) have excellent physical properties and other desirable characteristics for a textile material. They also, as has been indicated, have a high capacity for and are readily and satisfactorily dyeable to deep and level shades of coloration with any of a wide variety of dyestuffs. For example, they may be easily and successfully dyed according to conventional procedure using acid, vat, acetate, direct, naphthol and sulfur dyes.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index 11110—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the fiber products from the copolymers of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Color Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness despite repeated exposure and subjection to washing, laundering and dry cleaning treatments.

The invention is further exemplified in and by the following docent illustrations in which, unless otherwise indicated, all parts and percentages are to be taken by weight.

FIRST ILLUSTRATION

A solution of the following composition was made:

292.8 grams vinyl cyanide
37.3 grams N-vinyl-3-morpholinone (VM)
2802 grams of a 58.5 percent zinc chloride-aqueous solution (pH 5.2 diluted 10:1 with distilled water)

After mixing, about 3.28 grams of azo-bis-isobutyronitrile (AIBN) were mixed into the solution. The entire resulting preparation was then raised to 50° C. After about four hours at 50° C., the solution (which had become viscous) was debubbled to rid it of air and other fugaceous constituents.

The above debubbled solution was then cooled to room temperature, after which it was spun into fibers by extrusion thereof through a 500 hole spinnerette (having individual hole diameters of about 8 mils each) into an aqueous zinc chloride solution. The freshly spun fibers were then washed in fresh water and subsequently stretched in boiling water.

Three different fiber samples were made, but for all samples the coagulation bath concentration of $ZnCl_2$ was about 45.2 percent and the total stretch ratio was about 11.2 to 1.0.

The physical properties of the resulting fiber products were as set forth in the following tabulation (which also indicates some of the other conditions under which the fibers were spun):

Table 1

PHYSICAL PROPERTIES

| Sample | Temp. of coag. bath, °C | Denier | | Tenacity, grams/denier | | Elongation, percent | | Yield, grams | | Young's modulus | |
|---|---|---|---|---|---|---|---|---|---|---|---|
| | | Dry | Wet | Dry | Wet | Dry | Wet | Dry | Wet | Dry | Wet |
| "A" | 12.0 | 3.2 | 3.7 | 3.4 | 2.7 | 30 | 30 | 1.13 | 0.93 | 56 | 40 |
| "B" | 8.5 | 3.1 | 2.7 | 3.9 | 4.0 | 24 | 26 | 1.16 | 1.04 | 47 | 48 |
| "C" | 19.5 | 5.0 | 5.6 | 1.9 | 1.4 | 46 | 54 | 0.75 | 0.56 | 23 | 21 |

A sample of an acrylonitrile homopolymer prepared and spun under similar conditions as those employed for the above sample "A" had the following physical properties:

| Denier | | Tenacity, grams/denier | | Elongation, percent | | Yield, grams/denier | | Young modulus | |
|---|---|---|---|---|---|---|---|---|---|
| Dry | Wet | Dry | Wet | Dry | Wet | Dry | Wet | Dry | Wet |
| 3.4 | 3.1 | 3.45 | 2.9 | 44 | 49 | 0.90 | 0.79 | 32 | 32 |

Sample "A" dyed well to deep and level shades of coloration with excellent through penetration with Calcodur Pink 2BL (Colour Index Direct Red 75) in the conventional manner, after which its numerical reflectance value in the dyed state was determined. The reflectance value of the dyed sample was about 44.5. Fiber made identically from polyacrylonitrile had a reflectance value greater than 70 and, in addition, evidenced distinct characterists of being only ring-dyed.

Infra-red analysis of the fiber of Sample "A" indicated that it contained polymerized in the molecule about 4.17 percent of the VM.

The above-mentioned dyeing with Calcodur Pink 2BL was performed at the 2 percent level according to conventional procedure, in which the fiber sample was maintained for about one hour at the boil in the dye bath which contained the dyestuff in an amount equal to about 4 percent of the weight of the fiber (OWF). The dye bath also contained sodium sulfate (i.e., Glauber's salt) in an amount equal to about 15 percent OWF and had a bath-to-fiber weight ratio of about 30:1, respectively. After being dyed, the fiber was rinsed thoroughly with water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from 0 to 100 was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for vinyl cyanide polymer fibers dyed with 2 percent Calcodur Pink 2BL is generally considered by those skilled in the art to be representative of a degree of dye-receptivity that readily meets or exceeds the most rigorous practical requirements and is ordinarily assured of receiving general commercial acceptance and approval.

SECOND ILLUSTRATION

Another solution of the polymer in a zinc chloride solution was made in a manner similar to that described in the First Illustration. The composition of the starting solution was:

| | Grams |
|---|---|
| 58.5 percent aqueous solution of $ZnCl_2$ | [1] 1,401 |
| VCN | 146.4 |
| VM | 18.68 |
| AIBN | 1.64 |

[1] pH 5.77 upon 10:1 dilution with distilled water.

The reaction mixture was kept at 50° C. for 24 hours and then debubbled. The resultant polymer solution was spun through a 498 round jet hole spinnerette (of individual 3 mil diameter) under the conditions specified in, and had the properties shown by, the following Table 2:

*Table 2*

SPINNING CONDITIONS AND PROPERTIES

| Fiber Sample | $ZnCl_2$ conc. of coag. bath | Temp. of coag. bath, °C | Stretch | Denier | | Tenacity, grams/denier | | Elongation, percent | | Yield, grams | | Young's modulus | |
|---|---|---|---|---|---|---|---|---|---|---|---|---|---|
| | | | | Dry | Wet | Dry | Wet | Dry | Wet | Dry | Wet | Dry | Wet |
| "D" | 42.5 | 3.8 | 13.1X | 2.4 | 2.5 | 4.0 | 3.5 | 23 | 29 | 0.97 | 0.81 | 47 | 43 |
| "E" | 42.5 | 3.8 | 15.5X | 2.4 | 2.2 | 4.4 | 4.2 | 18 | 18 | 1.13 | 0.77 | 50 | |
| "F" | 40.4 | 3.8 | 15.6X | 2.9 | 3.0 | 4.3 | 4.1 | 18 | 17 | 1.00 | 0.80 | 40 | 50+ |

NOTE.—Under a tension of about 1 gm/√denier, sample "D" had an average flex life of 925 cycles; Sample "F" had an average flex life of 1,462 cycles.

THIRD ILLUSTRATION

The procedure of the First Illustration was again followed. The composition of the initial reaction mixture was:

| | Grams |
|---|---|
| 58.5 percent $ZnCl_2$ solution | 1,400 |
| VCN | 147 |
| VM | 9.34 |
| AIBN | 1.64 |

The polymerization was conducted at 50° C. for 24 hours. The resulting solution was then debubbled, and spun pursuant to the indication in the following tabulation (in which the properties of the fiber product are also included):

*Table 3*

SPINNING CONDITIONS AND PROPERTIES

| | |
|---|---|
| Coagulation bath concentration | 43.5 percent $ZnCl_2$. |
| Coagulation bath temperature | 4.5° C. |
| Total stretch | 14.5 : 1.0. |
| Denier | 2.0 grams dry; 1.9 grams wet. |
| Tenacity | 2.6 grams/denier dry; 1.9 grams/denier wet. |
| Elongation | 27 percent dry; 33 percent wet. |
| Yield | 0.98 gram dry; 0.71 gram wet. |
| Young's modulus | 44 dry; 23 wet. |
| Fiber density | 1.143 grams per cubic centimeter. |

Results similar to those obtained in the foregoing may be achieved when other polymerization methods are employed using other solvent or dispersing systems or when other of the N-vinyl-3-morpholinone monomers of the ring-substituted variety are utilized in place of the non-ring substituted species.

What is claimed is:

1. A fiber-forming copolymer comprised of: (1) between about 80 and about 99 weight percent, based on polymer weight, of interpolymerized vinyl cyanide; and (2) between about 20 and about 1 weight percent, based on copolymer weight, of an interpolymerized N-vinyl-3-morpholinone monomer, said N-vinyl-3-morpholinone monomer being of the structure:

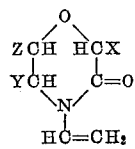

wherein X, Y and Z are each independently selected from the group consisting of hydrogen and alkyl radicals containing from 1 to about 4 carbon atoms.

2. The copolymer of claim 1 containing between about 85 and about 95 weight percent of vinyl cyanide interpolymerized therein.

3. The copolymer of claim 1 consisting only of the specified ingredients.

4. The copolymer of claim 1, wherein said N-vinyl-3-morpholinone monomer is non-ring-substituted N-vinyl-3-morpholinone.

5. A filamentary shaped article comprised of the copolymer of claim 1.

References Cited in the file of this patent

UNITED STATES PATENTS

| | | |
|---|---|---|
| 2,891,058 | Walles et al. | June 16, 1959 |
| 2,931,695 | Blankenship | Apr. 5, 1960 |
| 2,946,772 | Walles et al. | July 26, 1960 |
| 2,987,509 | Burgert | June 6, 1961 |